(12) United States Patent
Malamal Vadakital et al.

(10) Patent No.: US 11,653,024 B2
(45) Date of Patent: May 16, 2023

(54) METHOD AND TECHNICAL EQUIPMENT FOR ENCODING AND DECODING VOLUMETRIC VIDEO

(71) Applicant: Nokia Technologies Oy, Espoo (FI)

(72) Inventors: Vinod Kumar Malamal Vadakital, Tampere (FI); Kimmo Roimela, Tampere (FI); Johannes Pystynen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/050,935

(22) PCT Filed: May 7, 2018

(86) PCT No.: PCT/FI2018/050335
§ 371 (c)(1),
(2) Date: Oct. 27, 2020

(87) PCT Pub. No.: WO2019/215377
PCT Pub. Date: Nov. 14, 2019

(65) Prior Publication Data
US 2021/0235117 A1   Jul. 29, 2021

(51) Int. Cl.
*H04N 19/597* (2014.01)
*H04N 19/119* (2014.01)
(Continued)

(52) U.S. Cl.
CPC ......... *H04N 19/597* (2014.11); *H04N 13/243* (2018.05); *H04N 13/344* (2018.05); *H04N 19/119* (2014.11)

(58) Field of Classification Search
CPC .. H04N 19/597; H04N 13/344; H04N 13/243; H04N 19/119
See application file for complete search history.

(56) References Cited

U.S. PATENT DOCUMENTS 9,786,062 B2 * 10/2017 Sorkine-Hornung ... G06T 7/593
2002/0159628 A1   10/2002 Matusik et al.
(Continued)

FOREIGN PATENT DOCUMENTS

WO    98/049667 A2   11/1998

OTHER PUBLICATIONS

"Real-time Rendering with Compressed Animated Light Fields", Disney Research Studios, May 2017, 9 pages.
(Continued)

*Primary Examiner* — Tat C Ohio
(74) *Attorney, Agent, or Firm* — Harrington & Smith

(57) ABSTRACT

The various embodiments of the invention relates to a method and a technical equipment for video compression. The method comprises processing volumetric image data comprising a plurality of points; defining a hemisphere (601) around a surface (602) normal at each point in the volumetric image; partitioning each of the defined hemispheres spatially into a predefined number of angles (603); determining a representative radiance value for each angle of the predefined number of angles (603) of a defined hemisphere (601); generating a matrix (610) for a point storing the determined representative radiance values; and encoding the generated matrix (610) for the point for video compression.

19 Claims, 7 Drawing Sheets

(51) Int. Cl.
*H04N 13/344* (2018.01)
*H04N 13/243* (2018.01)

(56) References Cited

U.S. PATENT DOCUMENTS

| | | | |
|---|---|---|---|
| 2003/0071813 A1* | 4/2003 | Chiabrera | H04N 13/111 |
| | | | 345/426 |
| 2004/0041816 A1 | 3/2004 | Yamauchi | |
| 2006/0143142 A1 | 6/2006 | Vasilescu et al. | |
| 2007/0257913 A1 | 11/2007 | Sloan et al. | |
| 2013/0106855 A1 | 5/2013 | Urbach | |
| 2018/0097867 A1 | 4/2018 | Pang et al. | |
| 2019/0371051 A1* | 12/2019 | Dore | G06T 17/00 |

OTHER PUBLICATIONS

Nishino et al., "Determining Reflectance Parameters and Illumination Distribution from a Sparse Set of Images for View-dependent Image Synthesis", Proceedings Eighth IEEE International Conference on Computer Vision. ICCV, 2001, pp. 1-8.

Cabral et al., "Reflection Space Image Based Rendering", Proceedings of the 26th annual conference on Computer graphics and interactive techniques, 1999, pp. 165-171.

International Search Report and Written Opinion received for corresponding Patent Cooperation Treaty Application No. PCT/FI2018/050335, dated Mar. 28, 2019, 16 pages.

Vasilescu et al., "TensorTextures: Multilinear Image-Based Rendering", ACM Transactions on Graphics, 2004, pp. 336-342.

Filip et al., "Bidirectional Texture Function Modeling: A State of the Art Survey", IEEE Transactions on Pattern Analysis and Machine Intelligence, vol. 31, No. 11, Nov. 2009, pp. 1921-1940.

Chen, Wei-Chao, et al., "Light Field Mapping: Efficient Representation and Hardware Rendering of Surface Light Fields", ACM Transactions on Graphics, ACM, NY, US, vol. 21, No. 3, Jul. 1, 2002, pp. 447-456.

Miller, Gavin, Dr., et al., "Lazy decompression of surface light fields for precomputed global illumination", Eurographics, Jan. 1, 1998, pp. 281-292.

* cited by examiner

METHOD AND TECHNICAL EQUIPMENT FOR ENCODING AND DECODING VOLUMETRIC VIDEO

RELATED APPLICATION

This application claims priority to PCT Application No. PCT/FI2018/050335, filed on May 7, 2018, which is incorporated herein by reference in its entirety.

TECHNICAL FIELD

The present solution generally relates to virtual reality. In particular, the solution relates to a method, an apparatus and a computer program product for encoding and decoding dynamic digital volumetric video.

BACKGROUND

Since the beginning of photography and cinematography, the most common type of image and video content has been captured by cameras with relatively narrow field of view, and displayed as a rectangular scene on flat displays. Such content is referred as "flat content", or "flat image", or "flat video" in this application. The cameras are mainly directional, whereby they capture only a limited angular field of view (the field of view towards which they are directed).

More recently, new image and video capture devices are available. These devices are able to capture visual and audio content all around them, i.e. they can capture the whole angular field of view, sometimes referred to as 360 degrees field of view. More precisely, they can capture a spherical field of view (i.e., 360 degrees in all spatial directions). Furthermore, new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

For volumetric video, a scene may be captured using one or more 3D (three-dimensional) cameras. The cameras are in different positions and orientations within a scene. One issue to take into account is that compared to 2D (two-dimensional) video content, volumetric 3D video content has much more data, so viewing it requires lots of bandwidth (with or without transferring it from a storage location to a viewing device): disk I/O, network traffic, memory bandwidth, GPU (Graphics Processing Unit) upload. Capturing volumetric content also produces a lot of data, particularly when there are multiple capture devices used in parallel.

SUMMARY

Now there has been invented an improved method and technical equipment implementing the method, for encoding and decoding dynamic digital volumetric video. Various aspects of the invention include a method, an apparatus, and a computer readable medium comprising a computer program stored therein, which are characterized by what is stated in the independent claims. Various embodiments of the invention are disclosed in the dependent claims.

According to a first aspect, there is provided a method comprising processing volumetric image data comprising a plurality of points; defining a hemisphere around a surface normal at each point in the volumetric image; partitioning each of the defined hemispheres spatially into a predefined number of angles; determining a representative radiance value for each angle of the predefined number of angles of a defined hemisphere; generating a matrix for a point storing the determined representative radiance values; and encoding the generated matrix for the point for video compression According to a second aspect, there is provided an apparatus comprising at least means for processing volumetric image data comprising a plurality of points; means for defining a hemisphere around a surface normal at each point in the volumetric image; means for partitioning each of the defined hemispheres spatially into a predefined number of angles; means for determining a representative radiance value for each angle of the predefined number of angles of a defined hemisphere; means for generating a matrix for a point storing the determined representative radiance values; and means for encoding the generated matrix for the point for video compression.

According to a third aspect, there is provided an apparatus comprising at least one processor, memory including computer program code, the memory and the computer program code configured to, with the at least one processor, cause the apparatus to process volumetric image data comprising a plurality of points; define a hemisphere around a surface normal at each point in the volumetric image; partition each of the defined hemispheres spatially into a predefined number of angles; determine a representative radiance value for each angle of the predefined number of angles of a defined hemisphere; generate a matrix for a point storing the determined representative radiance values; and encode the generated matrix for the point for video compression.

According to a fourth aspect, there is provided a computer program product embodied on a non-transitory computer readable medium, comprising computer program code configured to, when executed on at least one processor, cause an apparatus or a system to process volumetric image data comprising a plurality of points; to define a hemisphere around a surface normal at each point in the volumetric image; to partition each of the defined hemispheres spatially into a predefined number of angles; to determine a representative radiance value for each angle of the predefined number of angles of a defined hemisphere; to generate a matrix for a point storing the determined representative radiance values; and to encode the generated matrix for the point for video compression.

According to an embodiment, multiple generated matrices are packed into a larger matrix, and means for encoding the larger matrix.

According to an embodiment, matrices of neighbouring points are interleaved before encoding to generated an interleaved matrix, and means for encoding the interleaved matrix.

According to an embodiment, each value of the generated matrix is layered for every point to generated a layered matrix, and encoding the layered matrix.

According to an embodiment, the computer program product is being embodied on a non-transitory computer readable medium.

According to an embodiment, the representative radiance value is an average radiance value.

DESCRIPTION OF THE DRAWINGS

In the following, various embodiments of the invention will be described in more detail with reference to the appended drawings, in which.

DESCRIPTION OF EXAMPLE EMBODIMENTS

In the following, several embodiments of the invention will be described in the context of video coding arrangement. It is to be noted however, that the invention is not limited to this particular arrangement. For example, the invention may be applicable to video coding systems like streaming systems, DVD (Digital Versatile Disc) players, digital television receivers, personal video recorders, systems and computer programs on personal computers, handheld computers and communication devices, as well as network elements such as transcoders and cloud computing arrangements where video data is handled.

The present embodiments relate to light field video coding with tiled hemisphere sampling.

Figure 1:
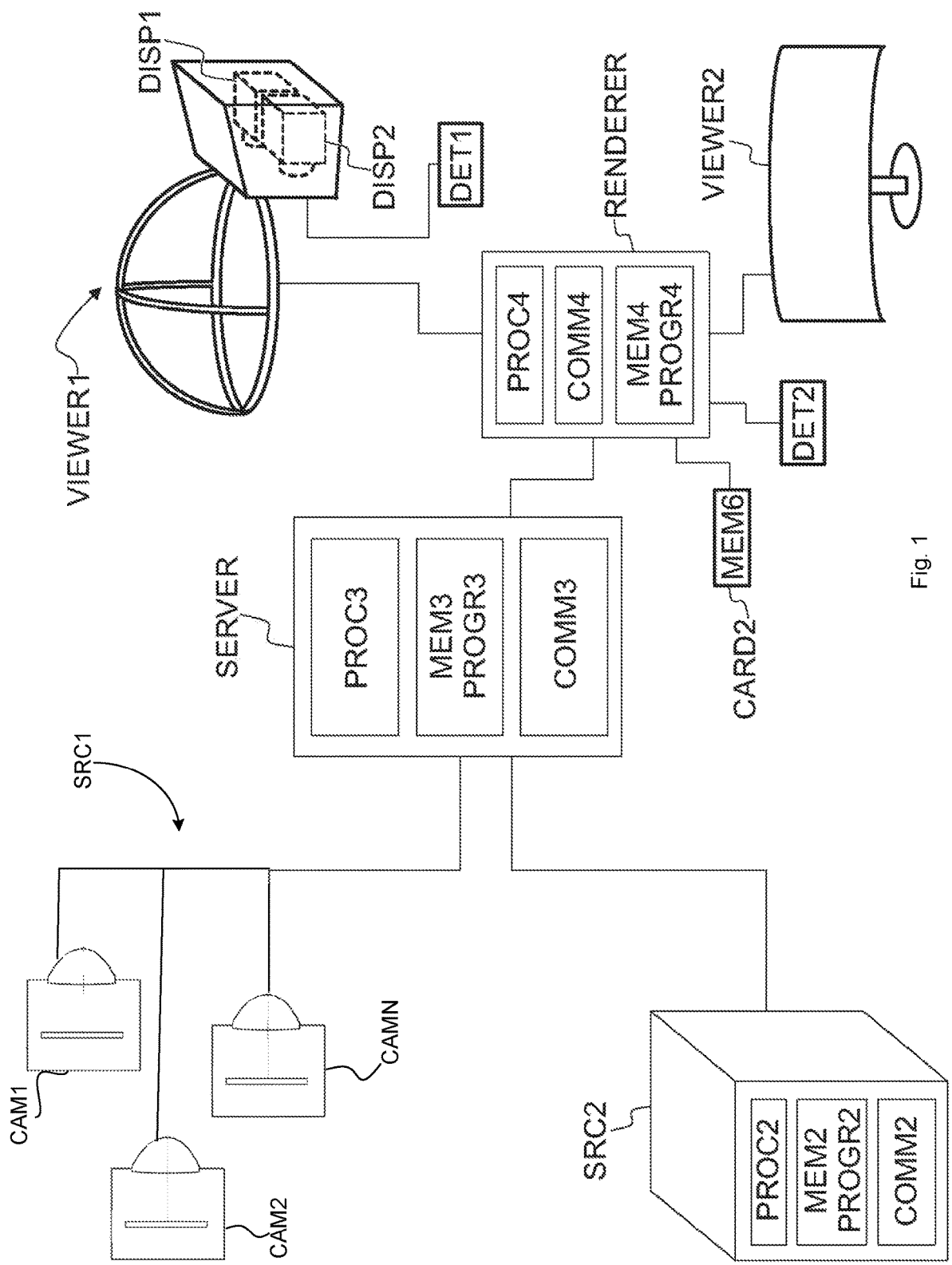
FIG. 1 shows a system according to an embodiment for generating and viewing volumetric video.

FIG. 1 shows a system and apparatuses for stereo viewing, that is, for 3D video and 3D audio digital capture and playback. The task of the system is that of capturing sufficient visual and auditory information from a specific location such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of images with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 1 may consist of three main parts: image sources, a server and a rendering device. A video capture device SRC1 comprises one or more cameras CAM1, CAM2, ..., CAMN with overlapping field of view so that regions of the view around the video capture device is captured from at least two cameras. The device SRC1 may comprise multiple microphones (not shown in FIG. 1) to capture the timing and phase differences of audio originating from different directions. The device SRC1 may comprise a high resolution orientation sensor so that the orientation (direction of view) of the plurality of cameras can be detected and recorded. The device SRC1 comprises or is functionally connected to a computer processor and memory, the memory comprising computer program code for controlling the video capture device. The image stream captured by the video capture device may be stored on a memory device for use in another device, e.g. a viewer, and/or transmitted to a server using a communication interface. It needs to be understood that although a camera setup of three cameras is described here as part of the system, another type of setup may be used instead as part of the system.

Alternatively or in addition to the video capture device SRC1 creating an image stream, or a plurality of such, one or more sources SRC2 of synthetic images may be present in the system. Such sources of synthetic images may use a computer model of a virtual world to compute the various image streams it transmits. For example, the source SRC2 may compute N video streams corresponding to N virtual cameras located at a virtual viewing position. When such a synthetic set of video streams is used for viewing, the viewer may see a three-dimensional virtual world. The device SRC2 comprises or is functionally connected to a computer processor PROC2 and memory MEM2, the memory comprising computer program PROGR2 code for controlling the synthetic sources device SRC2. There may be a storage, processing and data stream serving network in addition to the capture device SRC1. For example, there may be a server SERVER or a plurality of servers storing the output from the capture device SRC1 or computation device SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROG4 code for controlling the viewing devices. The viewer (playback) devices may consist of a data stream receiver for receiving a video data stream from a server and for decoding the video data stream. The data stream may be received over a network connection through communications interface COMM4, or from a memory device MEM6 like a memory card CARD2. The viewer devices may have a graphics processing unit for processing of the data to a suitable format for viewing. The viewer VIEWER1 comprises a high-resolution stereo-image head-mounted display for viewing the rendered stereo video sequence. The head-mounted display may have an orientation sensor DET1 and stereo audio headphones. According to an embodiment, the viewer VIEWER2 comprises a display enabled with 3D technology (for displaying stereo video), and the rendering device may have a head-orientation detector DET2 connected to it. Alternatively, the viewer VIEWER2 may comprise a 2D display, since the volumetric video rendering can be done in 2D by rendering the viewpoint from a single eye instead of a stereo eye pair. Any of the devices (SRC1, SRC2, SERVER, RENDERER, VIEWER1, VIEWER2)

may be a computer or a portable computing device, or be connected to such. Such rendering devices may have computer program code for carrying out methods according to various examples described in this text.

Figure 2A:
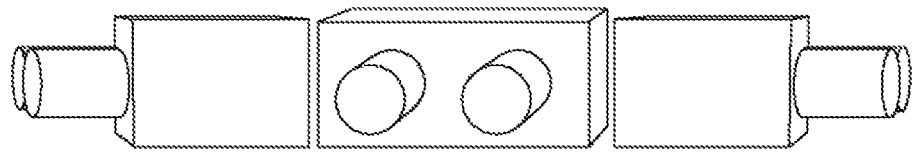
FIG. 2a shows a camera device according to an embodiment comprising two cameras.

FIG. 2a shows a camera device 200 for stereo viewing. The camera comprises two or more cameras that are configured into camera pairs 201 for creating the left and right eye images, or that can be arranged to such pairs. The distances between cameras may correspond to the usual (or average) distance between the human eyes. The cameras may be arranged so that they have significant overlap in their field-of-view. For example, wide-angel lenses of 180-degrees or more may be used, and there may be 2, 3, 4, 5, 6, 7, 8, 9, 10, 12, 16, or 20 cameras. The cameras may be regularly or irregularly spaced to access the whole sphere of view, or they may cover only part of the whole sphere. For example, there may be three cameras arranged in a triangle and having different directions of view towards one side of the triangle such that all three cameras cover an overlap area in the middle of the directions of view. As another example, 8 cameras having wide-angle lenses and arranged regularly at the corners of a virtual cube and covering the whole sphere such that the whole or essentially whole sphere is covered at all directions by at least 3 or 4 cameras. In FIG. 2a three stereo camera pairs 201 are shown.

Figure 2B:
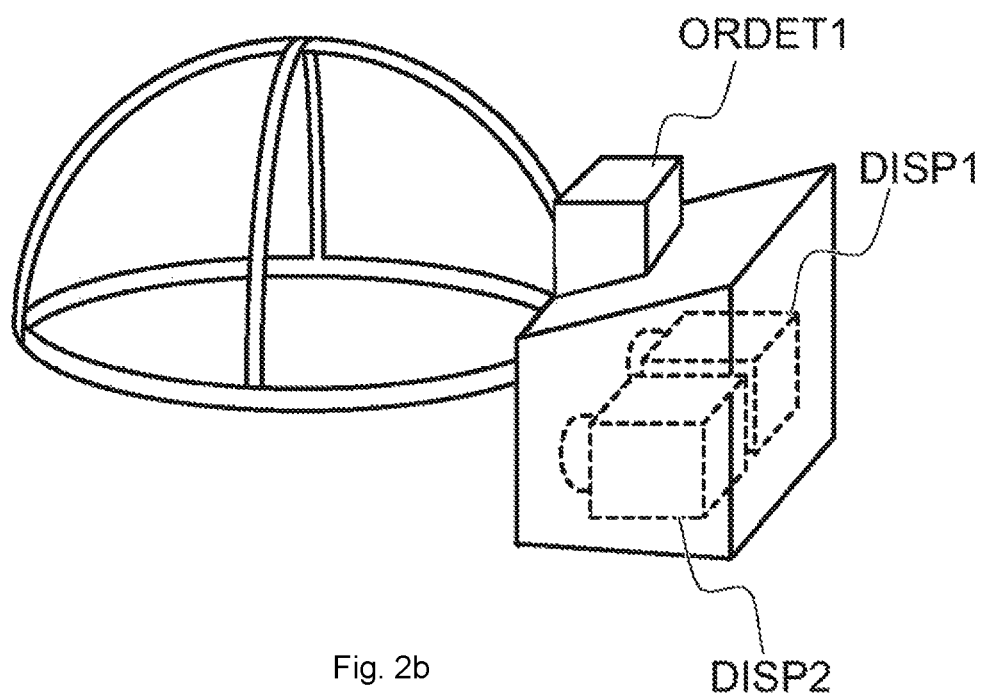
FIG. 2b shows a viewing device according to an embodiment.

FIG. 2b shows a head-mounted display (HMD) for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

Figure 3:
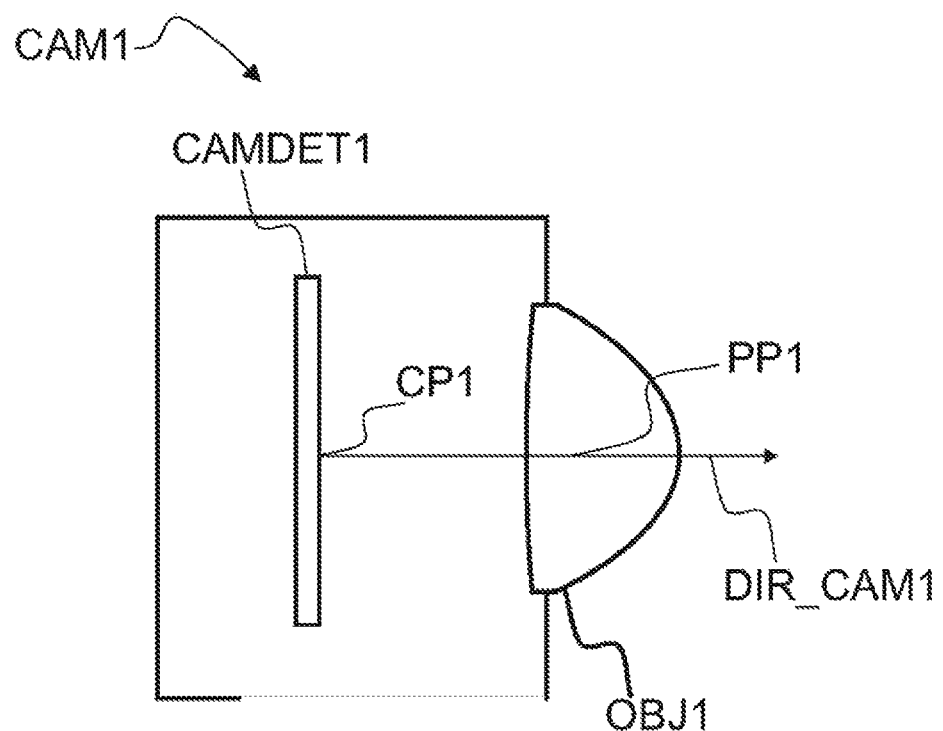
FIG. 3 shows a camera according to an embodiment.

FIG. 3 illustrates a camera CAM1. The camera has a camera detector CAMDET1, comprising a plurality of sensor elements for sensing intensity of the light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal center point CP1 that is a middle point of the plurality of sensor elements, for example for a rectangular sensor the crossing point of the diagonals. The lens has a nominal center point PP1, as well, lying for example on the axis of symmetry of the lens. The direction of orientation of the camera is defined by the line passing through the center point CP1 of the camera sensor and the center point PP1 of the lens. The direction of the camera is a vector along this line pointing in the direction from the camera sensor to the lens. The optical axis of the camera is understood to be this line CP1-PP1.

The system described above may function as follows. Time-synchronized video, audio and orientation data is first recorded with the capture device. This can consist of multiple concurrent video and audio streams as described above. These are then transmitted immediately or later to the storage and processing network for processing and conversion into a format suitable for subsequent delivery to playback devices. The conversion can involve post-processing steps to the audio and video data in order to improve the quality and/or reduce the quantity of the data while preserving the quality at a desired level. Finally, each playback device receives a stream of the data from the network, and renders it into a stereo viewing reproduction of the original location which can be experienced by a user with the head-mounted display and headphones.

Figure 4:
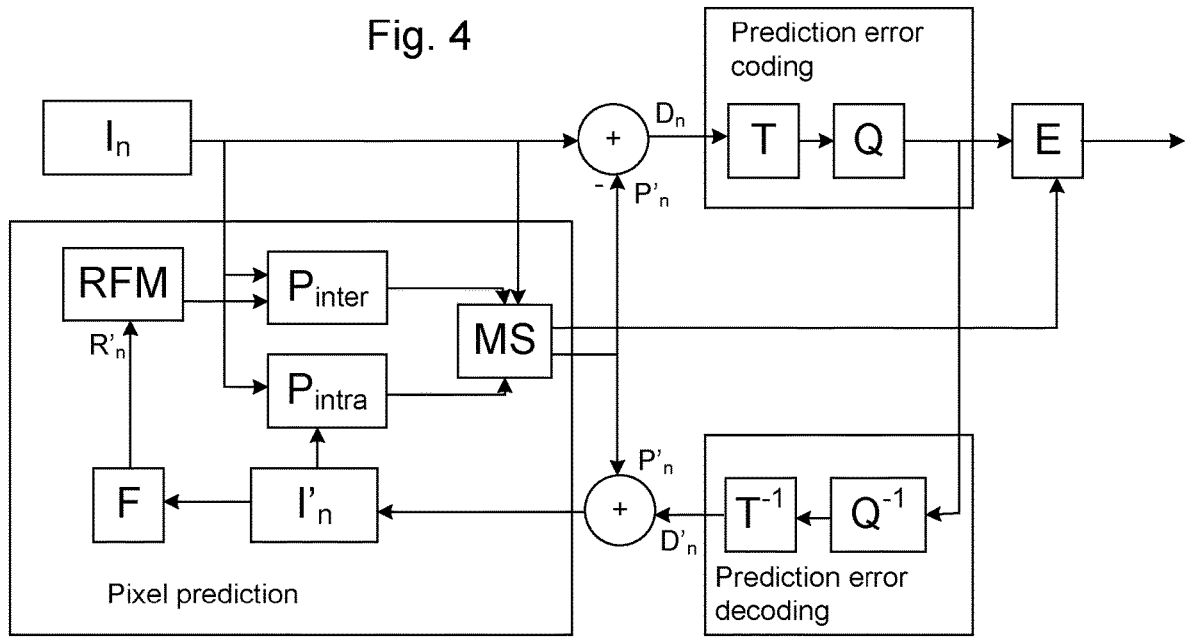
FIG. 4 shows an encoding process according to an embodiment.
Figure 5:
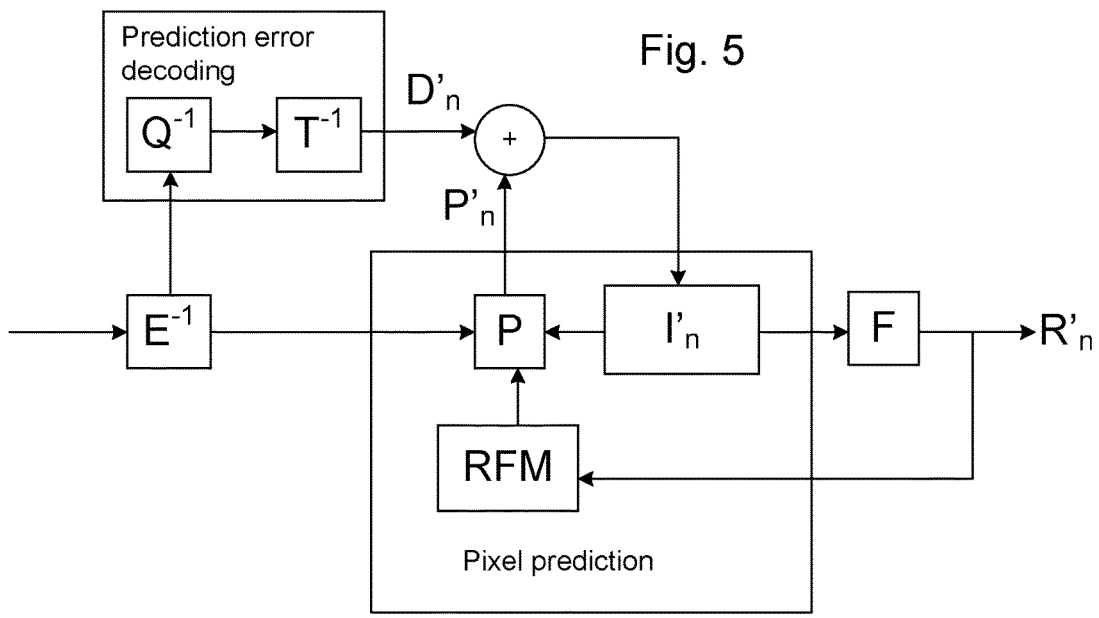
FIG. 5 shows a decoding process according to an embodiment.

A volumetric video codec consists of an encoder that transforms an input dynamic volumetric scenes into a compressed representation suited for storage/transmission and a decoder that can uncompress the compressed representation back into a viewable form. The encoder may discard some information in the original representation to produce a bit stream that is compact (e.g., lower bitrate). Furthermore, only the data required for rendering the view frustum needs to be extracted from the encoded representation, for decoding. An example of an encoding process is illustrated in FIG. 4. FIG. 4 illustrates an image to be encoded ($I''$); a predicted representation of an image block ($P'''$); a prediction error signal ($D''$); a reconstructed prediction error signal ($D'''$); a preliminary reconstructed image ($I'''$); a final reconstructed image ($R'''$); a transform (T) and inverse transform ($T^{-1}$); a quantization (Q) and inverse quantization ($Q^{-1}$); entropy encoding (E); a reference frame memory (RFM); inter prediction ($P^{inter}$); intra prediction ($P^{intra}$); mode selection (MS) and filtering (F). An example of a decoding process is illustrated in FIG. 5. FIG. 5 illustrates a predicted representation of an image block ($P'''$); a reconstructed prediction error signal ($D'''$); a preliminary reconstructed image ($I'''$); a final reconstructed image ($R'''$); an inverse transform ($T^{-1}$); an inverse quantization ($Q^{-1}$); an entropy decoding ($E^{-1}$); a reference frame memory (RFM); a prediction (either inter or intra) (P); and filtering (F).

In some video codecs, video pictures are divided into coding units (CU) covering the area of the picture. A CU consists of one or more prediction units (PU) defining the prediction process for the samples within the CU and one or more transform units (TU) defining the prediction error coding process for the samples in the said CU. A CU may consist of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU may have at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Volumetric video data represents a three-dimensional (3D) time-varying scene. Such data describes geometry (shape, size, position in 3D-space) and respective attributes (e.g. colour, opacity, reflectance), plus any possible temporal changes of the geometry and attributes in given time instances. "Voxel" of a three-dimensional world corresponds to a pixel of a two-dimensional world. Voxels exist in a 3D grid layout. A voxel or point may have number of attributes that describe its properties. One common attribute is colour. Other attributes can be opacity, a 3D surface normal vector, and parameters describing the surface material.

Increasing computational resources and advances in 3D data acquisition devices has enabled reconstruction of highly detailed volumetric video representations of natural scenes. Infrared, lasers, time-of-light and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications such as capturing real world 3D scenes, where the topology is not necessarily a 2D manifold. Another way to represent 3D data is coding this 3D data set as a set of texture and depth map as is the case in the multi-view plus depth. Closely related to the techniques used in multi-view plus depth is the use of elevation maps, and multi-level surface maps.

For an application that targets to a photo-realistic rendering of the viewing frustum (i.e. the visible scene segment for a viewer), and due to way light interacts with materials of objects within the scene, the encoder should account for aspects such as view dependent colour changes (e.g., reflections, direct and in-direct illumination, glossiness, and caustics). In such cases, multiple views that bake the texture of materials from different view angles does not provide for efficient compression. The present embodiments are related to a solution enabling efficient compression of multiple views taking into consideration view dependent colour changing aspects of any point in the volumetric scene.

One example for solving the problem is to create light field, for example, from multiple images. Depth information may be used to project the colour images to correct places in the 3D representation.

The present embodiments are targeted to the aforementioned problem by storing a representative radiance value per point per specified solid angle in a matrix. Two non-limiting examples of a representative radiance value are an average radiance or a radiance corresponding to a certain (e.g. central) direction only. Radiance is total amount of light reflected from a surface point (X) in the scene towards a particular direction (P) in space. For a fully synthetic scene, the radiance may be calculated by solving the rendering equation by using raytracing based algorithms. For a natural scene, the radiance is the value obtained by sampling the same point by many cameras with different orientation. The generated matrix is referred here to as the "point radiance (PR) matrix". A PR matrix's dimensions depend on the chosen solid angle resolution required to render the surface point accurately onto the viewpoint. The computing of the representative radiance values for each cell in the PR matrix can be done after the accumulation of individual radiance values resulting after using any ray-tracing or path-tracing strategies. Alternatively, averaging can be left out altogether, storing only the radiance corresponding to the central direction of each cell. For sufficiently smooth materials, this will still produce a reasonable reconstruction of the overall exitant radiance. The PR matrix size can also be chosen so as to suite any current or next generation video coding algorithms.

For photo-realistic rendering, it is important that the rendered image accurately captures the colours. This depends on how the different light sources interact with the objects in the scene. Examples of different ways light rays can interact with material surfaces comprises, for example, directional diffuse reflection or ideal diffuse reflection from anomalous surface, specular reflection from an incident light, absorption, multiple scattering, etc. The nature of the light sources, the geometry of the scene, and materials and colours of objects that make up the scene are all important aspects to be considered when rendering an image from the scene. An object may absorb, diffract, reflect or refract the incident light. The colour of any point in the scene is the result of the cumulative light reflected/refracted/emitted from that point towards the viewpoint, which in turn is dependent on the cumulative light incident at that point and the nature of the material at that point. For specular materials, a movement of the viewpoint can change the colour values. If the colour of a point in the 3D scene does not match the colours depicted in the viewpoint, the rendering would not look photo-realistic.

Figure 6:
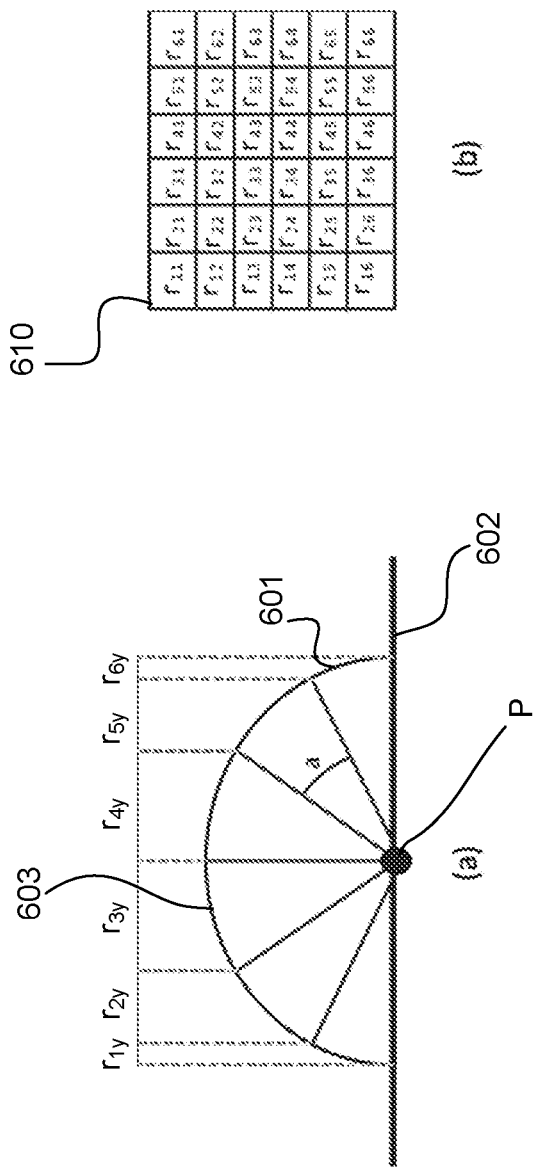
FIG. 6a shows an example of a projection of a representative radiance value across a defined hemisphere.
FIG. 6b shows an example of point radiance matrix.

The present embodiments are targeted to this kind of a view dependent colour variation problem. According to an embodiment, for each point in the scene geometry, a hemisphere 601 around a surface normal 602 at the point P is considered, as shown in FIG. 6a. This surface hemisphere 601 is then spatially partitioned into a pre-defined number of solid angles 603. The number of partitions may vary from point to point in the scene geometry. Average radiance or other representative radiance value at the point P is computed for each solid angle 603 using methods such as a known ray tracing method, a known path tracing method or other current or future variations of these. The computed values are used to fill a two dimensional matrix, an example of which is shown in FIG. 6b with reference 610 after the mapping process has been done. By encoding this matrix for each point in the scene geometry, for a given orientation of a viewpoint, the value that is to be rendered can be easily retrieved by using the viewpoint's normal value.

The redundancy exhibited by the PR matrix 610 of a point P depends on the nature of the material the point P belongs to. For example, a point on a material that is highly diffused will exhibit high redundancy, and a point that is on a purely reflected surface may exhibit a much lower redundancy. In other words, the efficiency of compression of a PR matrix is dependent on the nature of material it belongs to.

A rendering application may compromise between compression efficiency and accessibility. In the following, various embodiments are described on how an encoder may choose to compress a scene where PR matrix has been evaluated for all points in the scene.

According to an embodiment, each point in a texture map of a scene is represented by a small PR matrix. This means that each pixel in the texture map of a scene may be replaced by its PR matrix. The size of the PR matrix is chosen such that it can be coded using a transform size(s) supported by the encoder (e.g. 8×8, 16×16, 32×32 or 64×64). Although the amount of data to be encoded in this embodiment is relatively big, the resulting decoded image can be efficiently sampled by a renderer to pick the right values from the PR matrix for rendering.

Figure 7:
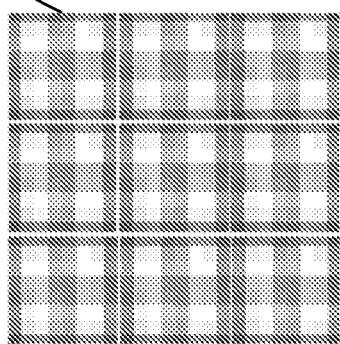
FIG. 7 shows an example of a model points encoded as transform units.

FIG. 7 illustrates a 3×3 patch of model points encoded as nine 8×8 Transform Units (TU) 701, each TU coding 64 different viewing angles around the normal vector of the respective model point.

According to another embodiment, multiple PR matrices for respective multiple points in the scene can be packed into a larger matrix having a size suitable for encoding. For example, four PR matrices representing four adjacent pixels in the texture map may be packed into one coding transform unit of an HEVC encoder. The packing may occur after downscaling of the PR matrices. The packing of multiple PR matrices into one transform unit (TU) may be useful in several cases: where the surface material is more diffuse and the reflected colour does not change so rapidly depending on the viewing angle, or where the rendering application caters to a limited viewing volume, and only those pixels representing surfaces that are closer to the viewing volume require higher resolution, but those that are further away may require less resolution. This enables trade-offs for coding heterogeneous scenes and models where parts of the surfaces are pure diffuse surfaces, and only some of the material in the scene are specular. For points on materials that are purely diffused, the PR matrix degenerates to a single value which those that are specular might require larger PR matrices.

Figure 8:
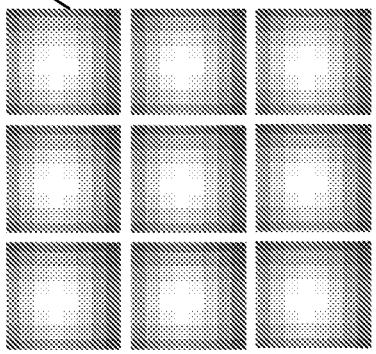
FIG. 8 shows another example of model points encoded into transform units.

FIG. 8 illustrates a 6×6 patch of model points encoded into the nine 8×8 TUs 801, each TU containing four points, but with only 16 viewing directions each.

According to a yet other embodiment, it is considered that that neighbouring pixels can be highly correlated for any given viewing angle, whereupon the PR matrices of neighbouring pixels can be interleaved on a block basis before being handed over to the encoder.

Figure 9:
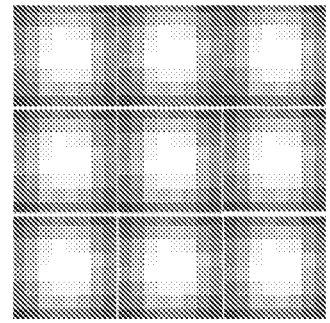
FIG. 9 shows an example of data of FIG. 8 rearranged for improved coherence.

FIG. 9 illustrates the data of FIG. 8 being rearranged by interleaving for improved coherence and better compression.

Figure 10:
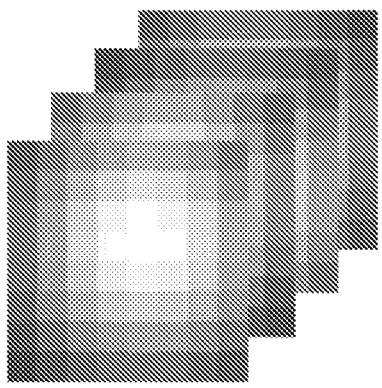
FIG. 10 shows an example of a layered image.

According to yet other embodiment, each individual value of a PR matrix for every pixel in the texture map can be layered. Such a strategy may be useful in a rendering application that desires to optimize the data to be decoded (see FIG. 10 showing a layered image). There can be multiple streams of these layers as well.

Figure 11:
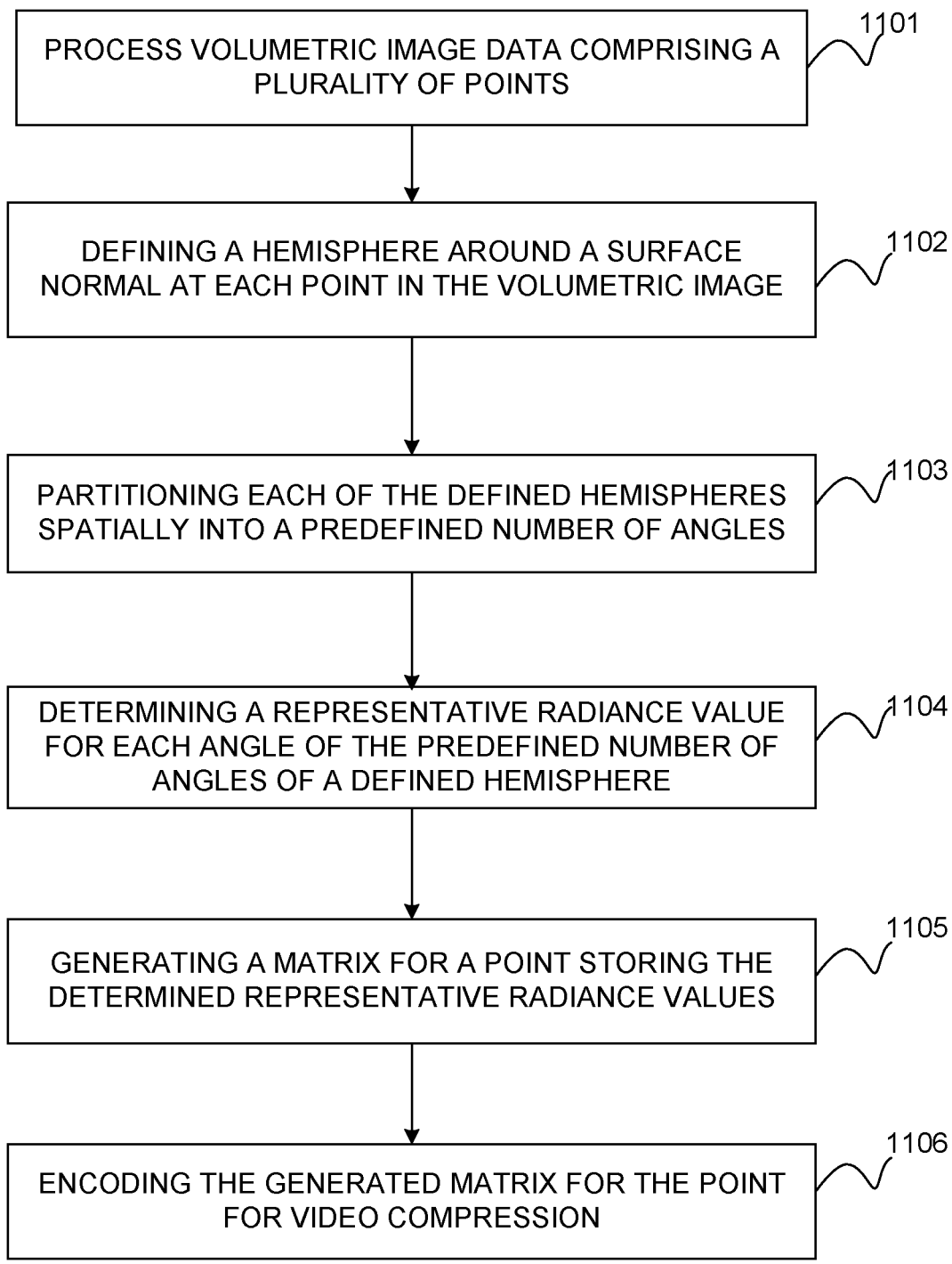
FIG. 11 is a flowchart illustrating a method for encoding according to an embodiment.

FIG. 11 is a flowchart illustrating a method comprising processing 1101 volumetric image data comprising a plurality of points; defining 1102 a hemisphere around a surface normal at each point in the volumetric image; partitioning 1103 each of the defined hemispheres spatially into a predefined number of angles; determining 1104 a representative radiance value for each angle of the predefined number of angles of a defined hemisphere; generating 1105 a matrix for a point storing the determined representative radiance values; and encoding 1106 the generated matrix for the point for video compression.

An apparatus according to an embodiment comprises means for processing volumetric image data comprising a plurality of points; means for defining a hemisphere around a surface normal at each point in the volumetric image; means for partitioning each of the defined hemispheres spatially into a predefined number of angles; means for determining a representative radiance value for each angle of the predefined number of angles of a defined hemisphere; means for generating a matrix for a point storing the determined representative radiance values; and means for encoding the generated matrix for the point for video compression. The means comprises at least one processor, and a memory including a computer program code, wherein the processor may further comprise processor circuitry. The memory and the computer program code are configured to, with the at least one processor, cause the apparatus to perform the method for encoding.

The computer program code comprises one or more operational characteristics. Said operational characteristics are being defined through configuration by said computer based on the type of said processor, wherein a system is connectable to said processor by a bus, wherein a programmable operational characteristic of the system comprises The various embodiments may provide advantages. In addition to the advantages presented in relation to various embodiments, the present embodiments enable storage of "full" hemisphere of radiance for the points. The management of multi-view/radiance from different angles is easily managed. The storing of the hemisphere data can be changed based on blocks, for bandwidth, quality and content needs.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
   processing volumetric image data comprising a plurality of points;
   defining a hemisphere around a surface normal at a point of the plurality of points in the volumetric image data, wherein the point is defined to be a center point of the defined hemisphere;
   partitioning the defined hemisphere spatially into a predefined number of angles;
   determining a respective representative radiance value for respective angles of the predefined number of angles of the defined hemisphere, wherein the respective radiance value is configured to indicate an amount of light reflected from the point at the respective angles;
   generating a matrix, for the point, storing the determined respective representative radiance values; and
   encoding the generated matrix, for the point, for video compression, wherein the encoded generated matrix is configured to enable a rendering of the point based, at least partially, on a viewing angle of the point and a representative radiance value, of the matrix, corresponding to the viewing angle.

2. The method according to claim 1 further comprising:
   packing multiple generated matrices into a larger matrix, wherein the multiple generated matrices comprises, at least, the generated matrix; and
   encoding the larger matrix.

3. The method according to claim 1 further comprising:
   interleaving matrices of neighbouring points before encoding to generate an interleaved matrix, wherein the neighbouring points comprises, at least, the point; and
   encoding the interleaved matrix.

4. The method according to claim 1 further comprising:
   layering the determined respective representative radiance values of the generated matrix for the plurality of points to generate a layered matrix; and
   encoding the layered matrix.

5. The method according to claim 1, wherein the respective representative radiance value is an average radiance value, wherein the predefined number of angles is equal to or greater than two.

6. The method of claim 1, wherein the predefined number of angles comprises angles associated with potential viewing angles around the surface normal at the point, wherein the predefined number of angles have respective endpoints at the point and extend from the point.

7. An apparatus comprising
at least one processor,
non-transitory memory including computer program code,
the memory and the computer program code configured to, with the at least one processor, cause the apparatus to:
process volumetric image data comprising a plurality of points;
define a hemisphere around a surface normal at a point of the plurality of points in the volumetric image data, wherein the point is defined to be a center point of the defined hemisphere;
partition the defined hemisphere spatially into a predefined number of angles;
determine a respective representative radiance value for respective angles of the predefined number of angles of the defined hemisphere, wherein the respective radiance value is configured to indicate an amount of light reflected from the point at the respective angles;
generate a matrix, for the point, storing the determined respective representative radiance values; and
encode the generated matrix, for the point, for video compression, wherein the encoded generated matrix is configured to enable a rendering of the point based, at least partially, on a viewing angle of the point and a representative radiance value, of the matrix, corresponding to the viewing angle.

8. The apparatus according to claim 7, wherein the apparatus is further caused to:
pack multiple generated matrices into a larger matrix, wherein the multiple generated matrices comprises, at least, the generated matrix; and
encode the larger matrix.

9. The apparatus according to claim 7, wherein the apparatus is further caused to:
interleave matrices of neighbouring points before encoding to generate an interleaved matrix, wherein the neighbouring points comprises, at least, the point; and
encode the interleaved matrix.

10. The apparatus according to claim 7, wherein the apparatus is further caused to:
layer the determined respective representative radiance values of the generated matrix for the plurality of points to generate a layered matrix; and
encode the layered matrix.

11. The apparatus according to claim 7, wherein respective representative radiance value is an average radiance value.

12. The apparatus of claim 7, wherein the predefined number of angles comprises angles associated with potential viewing angles around the surface normal at the point.

13. The apparatus of claim 7, wherein determining the respective representative radiance value comprises the apparatus is caused to:
perform ray tracing from the point for the respective angles of the predefined number of angles; and
determine the respective representative radiance value based on the ray tracing.

14. A computer program product embodied on a non-transitory computer readable medium, comprising computer program code configured to, when executed on at least one processor, cause an apparatus or a system to:
process volumetric image data comprising a plurality of points;
define a hemisphere around a surface normal at a point of the plurality of points in the volumetric image data, wherein the point is defined to be a center point of the defined hemisphere;
partition the defined hemisphere spatially into a predefined number of angles;
determine a respective representative radiance value for respective angles of the predefined number of angles of the defined hemisphere, wherein the respective radiance value is configured to indicate an amount of light reflected from the point at the respective angles;
generate a matrix, for the point, storing the determined respective representative radiance values; and
encode the generated matrix, for the point, for video compression, wherein the encoded generated matrix is configured to enable a rendering of the point based, at least partially, on a viewing angle of the point and a representative radiance value, of the matrix, corresponding to the viewing angle.

15. The computer program product according to claim 14, wherein the apparatus or the system is further caused to:
pack multiple generated matrices into a larger matrix, wherein the multiple generated matrices comprises, at least, the generated matrix; and
encode the larger matrix.

16. The computer program product according to claim 14, wherein the apparatus or the system is further caused to:
interleave matrices of neighbouring points before encoding to generate an interleaved matrix, wherein the neighbouring points comprises, at least, the point; and
encode the interleaved matrix.

17. The computer program product according to claim 14, wherein the apparatus or the system is further caused to:
layer the determined respective representative radiance values of the generated matrix for the plurality of points to generate a layered matrix; and
encode the layered matrix.

18. The computer program product according to claim 14, wherein the respective representative radiance value is an average radiance value.

19. The computer program product of claim 14, wherein the predefined number of angles comprises angles associated with potential viewing angles around the surface normal at the point.

* * * * *